(12) United States Patent
Zeine et al.

(10) Patent No.: US 10,418,861 B2
(45) Date of Patent: Sep. 17, 2019

(54) TRANSMISSION PATH IDENTIFICATION BASED ON PROPAGATION CHANNEL DIVERSITY

(71) Applicant: Ossia Inc., Bellevue, WA (US)

(72) Inventors: Hatem Ibrahim Zeine, Bellevue, WA (US); Ahmad Moghaddam, Kirkland, WA (US)

(73) Assignee: Ossia Inc., Bellevue, WA (US)

( * ) Notice: Subject to any disclaimer, the term of this patent is extended or adjusted under 35 U.S.C. 154(b) by 73 days.

(21) Appl. No.: 15/852,348

(22) Filed: Dec. 22, 2017

(65) Prior Publication Data

US 2019/0199145 A1 Jun. 27, 2019

(51) Int. Cl.
| | |
|---|---|
| *H02J 50/20* | (2016.01) |
| *H02J 50/80* | (2016.01) |
| *H02J 50/23* | (2016.01) |
| *H04B 7/02* | (2018.01) |
| *H02J 50/27* | (2016.01) |

(52) U.S. Cl.
CPC .............. *H02J 50/80* (2016.02); *H02J 50/20* (2016.02); *H02J 50/23* (2016.02); *H02J 50/27* (2016.02); *H04B 7/02* (2013.01)

(58) Field of Classification Search
CPC ............. H02J 50/20; H02J 50/23; H02J 50/27
See application file for complete search history.

(56) References Cited

U.S. PATENT DOCUMENTS

| | | | |
|---|---|---|---|
| 4,870,424 | A | 9/1989 | Lalezari et al. |
| 5,982,103 | A | 11/1999 | Mosebrook et al. |
| 6,178,140 | B1 | 1/2001 | Schlieter |
| 6,448,490 | B1 | 9/2002 | Katz |
| 8,072,380 | B2 | 12/2011 | Crouch |
| 8,310,201 | B1 | 11/2012 | Wright |
| 8,498,658 | B2 | 7/2013 | Smith et al. |
| 2003/0153266 | A1 | 8/2003 | Kim et al. |

(Continued)

FOREIGN PATENT DOCUMENTS

| | | |
|---|---|---|
| JP | 2010-503368 A | 1/2010 |
| WO | 2013/069951 A1 | 5/2013 |

(Continued)

OTHER PUBLICATIONS

European Patent Application No. 16856309.6, Extended European Search Report, 9 pages, dated Feb. 12, 2019.

(Continued)

*Primary Examiner* — Fritz M Fleming

(57) ABSTRACT

Various embodiments of the present technology relate generally to wireless power systems. More specifically, some embodiments relate to the use of time reversal techniques utilizing time diversity (e.g., different multipath arrivals at the same antenna) to achieve coherency from the same transmission node. For example, instead of initiating outgoing transmissions (e.g., power signals) at the same time, various embodiments can initiate the outgoing signals from the various antennas in a staggered timing that is a reversal of the arrival times of an incoming signal. As a result of staggering the start of the outgoing signals, the signals will arrive at the destination at approximately the same time even though they have traveled different paths having different propagation delays.

20 Claims, 8 Drawing Sheets

(56) References Cited

U.S. PATENT DOCUMENTS

| | | |
|---|---|---|
| 2003/0220092 A1 | 11/2003 | Hethuin et al. |
| 2005/0136845 A1 | 6/2005 | Masuoka et al. |
| 2007/0008132 A1 | 1/2007 | Ballantoni |
| 2008/0217309 A1 | 9/2008 | Rodgers |
| 2010/0033021 A1 | 2/2010 | Bennett |
| 2010/0041349 A1 | 2/2010 | Mahany et al. |
| 2010/0044123 A1 | 2/2010 | Perlman et al. |
| 2010/0178919 A1 | 7/2010 | Deepak et al. |
| 2010/0328073 A1 | 12/2010 | Nikitin et al. |
| 2011/0103517 A1 | 5/2011 | Hamalainen |
| 2011/0156640 A1 | 6/2011 | Moshfeghi |
| 2012/0262004 A1 | 10/2012 | Cook et al. |
| 2012/0274154 A1 | 11/2012 | DeLuca |
| 2012/0276854 A1 | 11/2012 | Joshi et al. |
| 2012/0302297 A1 | 11/2012 | Patel et al. |
| 2012/0326660 A1 | 12/2012 | Lu et al. |
| 2013/0026981 A1 | 1/2013 | Van Der Lee |
| 2013/0106661 A1 | 5/2013 | Xiang |
| 2013/0154892 A1 | 6/2013 | Zeltser et al. |
| 2013/0273870 A1 | 10/2013 | Shi |
| 2014/0091626 A1 | 4/2014 | Walley et al. |
| 2014/0117928 A1 | 5/2014 | Liao |
| 2014/0217967 A1 | 8/2014 | Zeine et al. |
| 2014/0268519 A1 | 9/2014 | Huang et al. |
| 2014/0302869 A1 | 10/2014 | Rosenbaum et al. |
| 2014/0361735 A1 | 12/2014 | Li et al. |
| 2015/0022022 A1 | 1/2015 | Zeine |
| 2015/0171512 A1 | 6/2015 | Chen et al. |
| 2015/0229133 A1 | 8/2015 | Reynolds et al. |
| 2016/0094092 A1 | 3/2016 | Davlantes et al. |
| 2017/0149294 A1* | 5/2017 | Wight .............. H02J 50/90 |

FOREIGN PATENT DOCUMENTS

| | | |
|---|---|---|
| WO | 2013/142720 A1 | 9/2013 |
| WO | 2016/019362 A1 | 2/2016 |

OTHER PUBLICATIONS

Japanese Patent Application No. 2018-518442, Office Action, 9 pages, dated Mar. 12, 2019.

International Application No. PCT/US2017/068156, International Search Report & Written Opinion, 9 pages, dated Sep. 19, 2018.

Hashemi, Homayoun, "The Indoor Radio Propagation Channel," Proceedings of the IEEE, vol. 81, No. 7, pp. 943-968, Jul. 1993.

Saleh, Adel A. M. et al., "A Statistical Model for Indoor Multipath Propagation," IEEE Journal on Selected Areas In Communications, vol. SAC-5, No. 2, pp. 128-137, Feb. 1987.

* cited by examiner

TRANSMISSION PATH IDENTIFICATION BASED ON PROPAGATION CHANNEL DIVERSITY

BACKGROUND

Many electronic devices are powered by batteries. Rechargeable batteries are often used to avoid the cost of replacing conventional dry-cell batteries and to conserve precious resources. The requirements of compact and faster devices that are enabled with standard wireless communication modules such as LTE, Wi-Fi, and Bluetooth transceivers have become a basic standard of modern mobile devices. Today's information-oriented users demand more sophisticated applications, and are in need to be connected constantly. These rising demands require more computational and transmission power which leave batteries thirsty for charge.

Rechargeable batteries are one option. However, conventional rechargeable battery chargers often require access to a power source such as an alternating current (AC) power outlet, which may not always be available or convenient. Current techniques for wireless charging have been limited to magnetic or inductive charging based solutions. Unfortunately, these solutions require a wireless power transmission system and a receiver to be in relatively close proximity to one another. Wireless power transmission at larger distances often use more advanced mechanisms such as, for example, transmission via radio frequency (RF) signals, ultrasonic transmissions, laser powering, to name a few, each of which present a number of unique hurdles to commercial success.

Systems that support wireless power transmission at larger distances may use sophisticated signal transmitting (Tx) and receiving (Rx) components. Precisely locating components in the environment and determining signal transmission paths therein is a prerequisite to providing Tx radiation patterns and targeting client Rx devices for efficient data communication and/or wireless power delivery. Further, in such systems, accurate location determinations of Tx and/or Rx devices in a dynamic environment is necessary to ensure effective and uninterrupted service. Efficiently computing such transmission paths and device locations can be challenging.

Accordingly, a need exists for technology that overcomes the problem demonstrated above, as well as one that provides additional benefits. The examples provided herein of some prior or related systems and their associated limitations are intended to be illustrative and not exclusive. Other limitations of existing or prior systems will become apparent to those of skill in the art upon reading the following detailed description.

SUMMARY

Various embodiments of the present technology relate generally to wireless power systems. More specifically, some embodiments relate to transmission path identification based on propagation channel diversity. For example, various embodiments of the present technology use time reversal techniques based on arrival time diversity (e.g., different phase of arrivals at the same antenna) of signaling within a multipath environment and achieve coherency from the same transmission node.

In some embodiments, a wireless signal (e.g., a beacon signal) can be received from a client device. The wireless signal transmitted from the client device can take multiple paths and therefore arrive at the array of antennas at different times. The time of arrival of the wireless signal at each antenna in the array of antennas can be determined. Then, a coherent transmission signal can be generated and sent to the client device from the array of antennas. The coherent transmission signal can be created by transmitting the signals which are time reversed versions of the incoming signals at each antenna. Some embodiments can record a magnitude and/or phase of the wireless signal received at each antenna in the array of antennas. In addition, generating the coherent transmission signal can include adjusting corresponding magnitudes of the coherent transmission signal in the array of antennas. The array of antennas can be an adaptively-phase antenna array in some embodiments.

Embodiments of the present technology also include computer-readable storage media containing sets of instructions to cause one or more processors to perform the methods, variations of the methods, and other operations described herein.

Some embodiments provide for a wireless power transmission system that includes a memory, one or more processors, an adaptively-phased antenna array, control circuitry, a signal generator, a pattern matching engine, and/or other components. The antenna array can have multiple radio frequency (RF) antennas. The control circuitry can be operatively coupled to the multiple RF antennas. In addition, the control circuitry can monitor arrival of a wireless signal from a client device at each of the RF antennas in the antenna array. An arrival profile can then be generated based, at least in part, on the arrival of the wireless signal at each RF antenna in the antenna array. The control circuitry can then send, from the antenna array, a transmission signal to the client device reversing the received wireless signal. This can be done, in some embodiments, without any direct time of arrival measurements. The control circuitry can record, in the memory, at least a portion of the wireless signal in the time domain and identify an arrival sequence. The wireless signal is in a multipath environment and the control circuitry monitors for multiple arrivals of the wireless signal at different times and samples the incoming wireless signal at each antenna in the antenna array. The signal generator can process the wireless signal and generate the transmission signal. The pattern matching engine can identify the incoming signal.

While multiple embodiments are disclosed, still other embodiments of the present technology will become apparent to those skilled in the art from the following detailed description, which shows and describes illustrative embodiments of the technology. As will be realized, the technology is capable of modifications in various aspects, all without departing from the scope of the present technology. Accordingly, the drawings and detailed description are to be regarded as illustrative in nature and not restrictive.

BRIEF DESCRIPTION OF THE DRAWINGS

Embodiments of the present technology will be described and explained through the use of the accompanying drawings.

Figure 1:
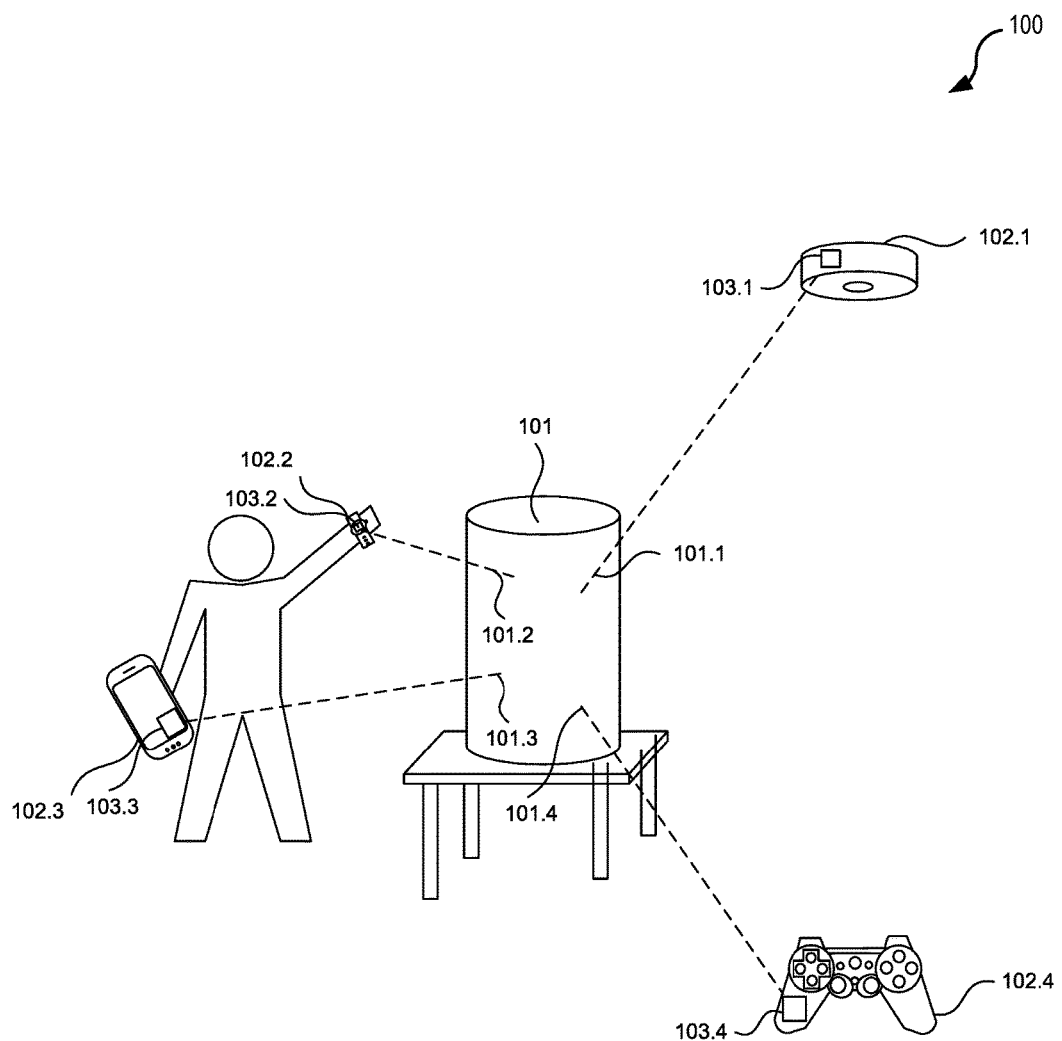
FIG. 1 is a diagram illustrating an example wireless communication/power delivery environment that may be utilized in one or more embodiments of the present technology.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology relate generally to wireless power systems. More specifically, some embodiments relate to transmission path identification based on propagation channel diversity. Traditional retrodirective phased array systems utilize the spatial diversity (e.g., different phase of arrivals measured at different antennas) and try to achieve coherency from different transmission nodes. In contrast, various embodiments of the present technology use time reversal techniques based on arrival time diversity (e.g., different phase of arrivals at the same antenna) and achieve coherency from the same transmission node.

For example, instead of initiating outgoing transmissions (e.g., power signals) at the same time, various embodiments can initiate the outgoing signals from the various antennas based on a reversal of the arrival times of an incoming signal. As a result of staggering the start of the outgoing signals, the signals will arrive at the destination at approximately the same time even though they have traveled different paths having different propagation delays. Such techniques can drastically reduce power consumption on both the transmitting and receiving devices.

In the following description, for the purposes of explanation, numerous specific details are set forth in order to provide a thorough understanding of embodiments of the present technology. It will be apparent, however, to one skilled in the art that embodiments of the present technology may be practiced without some of these specific details.

While, for convenience, embodiments of the present technology are described with reference to wireless power transmission systems and client receivers, embodiments of the present technology are equally applicable to various computing technologies using antenna arrays.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

FIG. 1 is a diagram illustrating an example wireless communication and power delivery environment 100 depicting wireless power delivery and data communication from one or more wireless transceiver systems 101 to various wireless client devices 102.1 to 102.4 within environment 100. Client power receivers 103.1 to 103.4 can be integrated into respective client devices 102.1 to 102.4 and configured to receive wireless power from the one or more transceiver systems 101. Within environment 100, the wireless delivery of power from transceiver system 101 to client power receivers 103.1 to 103.4 embedded in client devices 102.1 to 102.4 is also referred to herein as a wireless power transfer system (WPTS).

As shown in the embodiments illustrated in FIG. 1, wireless client devices 102.1 to 102.4 can include mobile phone devices (e.g., client device 102.3 having a respective client power receiver 103.3) and wearable electronics (e.g., client device 102.2 having a respective client power receiver 103.2). Client devices 102 can be any wireless device that needs power and capable of receiving wireless power via one or more integrated client power receivers 103.1 to 103.4.

Client devices 102.1 to 102.4 can be enabled to communicate with transceiver systems 101 and other communication devices (e.g., Wi-Fi and cellular networks). Client devices 102.1 to 102.4 can be further enabled to transmit beacon signals. Other client devices, not shown in FIG. 1, may not be configured and enabled to communicate (e.g., no Bluetooth or Wi-Fi capability) and thus do not transmit beacon signals. The one or more integrated power receiver clients, or "wireless power receivers," can receive and process power from the one or more transceiver systems 101 and provide the power to the client devices 102.1 to 102.4 for operation thereof.

Each transceiver system 101 can include an antenna array having a plurality of antenna elements that are each capable of delivering wireless power to client devices 102.1 to 102.4. Each transceiver system 101 can also transmit (Tx) and receive (Rx) wireless data communication signals to and from client devices 102.1 to 102.4, respectively. In some embodiments, the data communication antennas can communicate via Bluetooth™, Wi-Fi, ZigBee™, or other wireless communication protocols such IEEE 802.15.4 or IEEE 802.11. Also, in some embodiments, the wireless power and wireless communication signals can be delivered as a combined power/communication signal. In still other embodiments, not shown in FIG. 1, transceiver system 101 can include an additional antenna and/or an antenna array separate from the antenna array that implements data communication, but not wireless power delivery.

The transceiver system 101 can be configured to determine the appropriate phases to transmit coherent power signals 101.1-101.4 to client power receivers 103.1 to 103.4 as part of the WPTS. The antenna array can transmit a signal (e.g., a continuous wave or a pulsed power transmission signal) from each of the plurality of antenna elements at a specific phase relative to each other. Further, it is to be understood that use of the term "array" does not necessarily limit the antenna array to any specific array structure. That is, the antenna array need not be structured in a specific "array" form or geometry. Furthermore, as used herein, the term "array" or "array system" can be used to include related and peripheral circuitry for signal generation, reception, and transmission, such as in radios, digital logic, and modems.

Each client power receiver 103.1 to 103.4 can include one or more antennas (not shown) for receiving signals from the transceiver systems 101. The antenna array can be capable of emitting continuous wave signals at specific phases relative to each other. As discussed above, using an antenna array as a primary input device, transceiver system 101 can determine the appropriate phases for delivering coherent signals to the client power receivers 103.1 to 103.4. For example, coherent signals can be determined by computing the complex conjugate of a received beacon and/or other signal at each antenna element of the antenna array such that the coherent signal is properly phased for the particular client power receiver 103.1 to 103.4 that transmitted the beacon or other signal. The beacon signal and other signals described and illustrated, are primarily referred to herein as continuous waveforms, but alternatively or additionally take the form of modulated signal waveforms.

Although not illustrated in FIG. 1, each of the above listed components of the environment 100 (e.g., client power receivers 103.1 to 103.4, transceiver system 101, etc.) can include control and synchronization mechanisms, such as a data communication synchronization module. The transceiver systems 101 are connected to a power source such as, for example, a power outlet or source connecting the transmitters to a standard or primary alternating current (AC) power supply in a building. Alternatively, or additionally, one or more of the transceiver systems 101 can be powered by a battery or via another power-providing mechanism.

In some embodiments, the client power receivers 103 and/or the transceiver systems 101 utilize or encounter reflective surfaces such as, for example, walls or other RF reflective obstructions within range to beacon and deliver and/or receive wireless power and/or data within wireless communication and power delivery environment 100. One or more of the reflective surfaces can be utilized for multi-directional signal communication regardless of whether a blocking object is in the line of sight between transceiver system 101 and client power receiver 103. As a result, signals between the client power receivers and the transceiver system 101 may take multiple paths each having different propagation delays. Transceiver system 101 can record the incoming RF signal at the different antennas in the antenna array (e.g., by a raw sampling). The recordation of the arrival times for example can be used to construct an array of absolute and/or relative times of arrival. Then, any outgoing signaling to the client power receivers 103 can activate the antenna array elements effectively reversing arrival times and achieve coherency from the same transmission node.

As described herein, each client device 102.1 to 102.4 can be any system and/or device, and/or any combination of devices/systems that can establish a communication connection (e.g., session) with another device, a server and/or other systems within the example environment 100. In some embodiments, the client devices 102.1 to 102.4 include displays or other output functionalities to present data to a user and/or input functionalities to receive data from the user. By way of example, a client device 102 can be, but is not limited to, a video game controller, a server desktop, a desktop computer, a computer cluster, or a mobile computing device (such as a notebook, a laptop computer, a handheld or tablet computer, a mobile phone, a smart phone, a battery or component coupled to a battery, a PDA, etc.). The client device 102 can also be any wearable device such as watches, necklaces, rings, or even devices (e.g., medical or veterinary devices) implanted within a human or animal patient. Other examples of a client device 102 include, but are not limited to, safety sensors (e.g., fire or carbon monoxide), electric toothbrushes, electronic door locks/handles, electric light switch controllers, electric shavers, etc.

Although not illustrated in the example of FIG. 1, the transceiver system 101 and the client power receivers 103.1 to 103.4 can each include a data communication module for communication via a data channel. Alternatively, or additionally, the client power receivers 103.1 to 103.4 can direct the client devices 102.1 to 102.4 to communicate with the transceiver system 101 via existing data communications modules.

Figure 2:
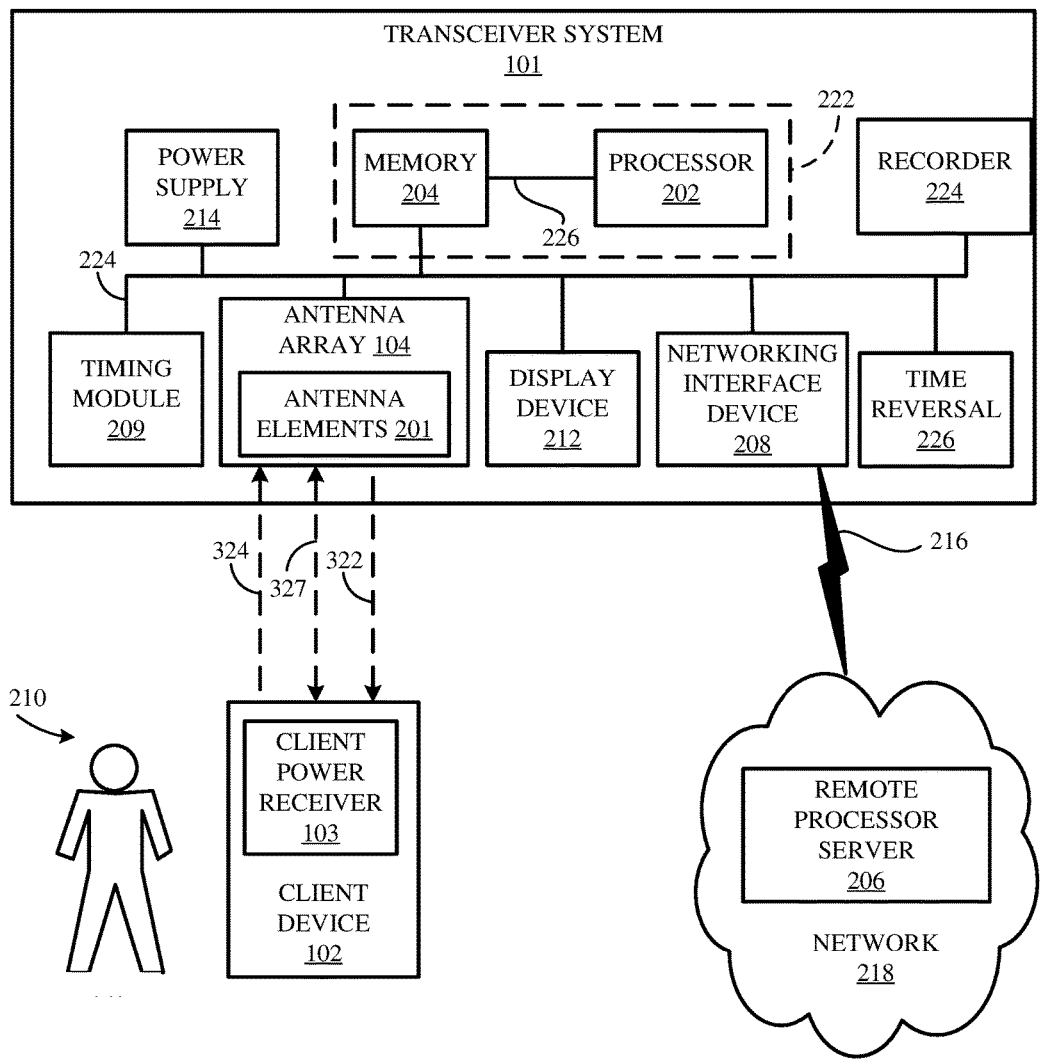
FIG. 2 is a block diagram illustrating an example transceiver system in accordance with various embodiments of the present technology.

FIG. 2 is a block diagram illustrating an example transceiver system 101 in accordance with an embodiment (e.g., transceiver system 101 shown in FIG. 1). The transceiver system 101 can include various functional components such as analog and digital electronic devices that are at least one of electrically and communicatively coupled together. In the embodiments shown in FIG. 2, antenna array 104 can include a plurality of antenna elements 201 arranged within antenna array 104 with a fixed geometry (not shown) relative to one another. In other embodiments, antenna array 104 includes one antenna element 201. In still other embodiments, antenna array 104 includes a plurality of antenna elements 201, but is capable of functioning in transceiver system 101 to perform the processes and methods described herein when only one element 201 is actually functioning for Tx, Rx, and/or power delivery.

As illustrated in FIG. 2, the functional components of transceiver system 101 can include a processor 202 and a memory 204 (including, e.g., a non-transitory processor-readable medium). Memory 204 can store various types and classes of data generated through, for example, the systems, methods, and processed described herein. Memory 204 can also store program instructions (e.g., software and/or firmware) that, when executed by processor 202, cause the processor 202 to manipulate (e.g., read, write, and delete operations, and combinations thereof) data stored in memory 204 and data stored in other transceiver system 101 components (e.g., data stored in registers and other data storage media thereof) associated with and/or communicatively coupled to processor 202 and/or memory 204. Through these data manipulations and other computationrelated actions of processor 202 (e.g., carried out by an arithmetic logic unit and/or CPU of processor 202), the program instructions direct the implementation of the methods and processes herein described.

The various functionality described herein for processor 202 and/or memory 204 may, in some embodiments, be carried out by substantially similar components of a remote processor server 206 (e.g., networked cloud server). For example, remote processor server 206 located some distance from transceiver system 101 can include a remote processor server 206 processor and a memory, not shown. For considerations such as speed of data processing, amount and/or availability of data storage in memory, and reducing the size of the transceiver system 101, remote processor server 206 may entirely replace processor 202 and/or memory 204 in transceiver system 101, or may supplement a fraction of that functionality in transceiver system 101.

Transceiver system 101 may also include a network interface device 208 which is capable of receiving and transmitting data over a wired or wireless network communications protocol, including data retrieved from and/or stored in memory 204 that is received from and/or transmitted to, respectively, client 102 and/or a cloud-based application executed by one or more processors in a computing device of remote processor server 206). Transceiver system 101 can also include a display device 212. User-friendly values (e.g., a processor 202-rendered 3D model of environment 100) may be displayed on display device 212 that are visible to a user and/or they may be transmitted to a computing device such as a laptop or desktop computer (not shown in FIG. 2) of the user that is communicatively coupled to transceiver system 101. Furthermore, transceiver system 101 includes a power supply 214 which provides appropriate levels of electric power to network interface device 208, antenna array 104, processor 202, and, as needed, memory 204.

In response to inputs and/or events including receipt of beacon signal 324 at antenna array 104, processor 202 can execute the program instructions to implement the methods and processes described herein. In a multipath environment, the signals, 322, 324, and 327 between transceiver system 101 and client power receiver 103 can take multiple paths each having a different propagation delay. As such, recorder 220 can record arrival times of the signals at the different antennas. Reversal module 222 can reverse time to generate a replay of the signal. Using the time reversed signal, timing module 209 can activate antenna elements 201 in a reverse order to the arrival when sending an outgoing signal (e.g., power signal 322). As a result, signals having paths with longer propagation delays are sent first and the smallest propagation delays sent last. This results in the signals arriving at the destination device (e.g., client power receiver 103) at substantially the same time.

Additional events such as receipt, via network interface device 208, of network traffic 216 including data and/or other signals from a network 218 further cause processor 202 to execute program instructions stored in memory 204 to implement processes and methods in transceiver system 101, either instead of, or in addition to, the methods and processes herein described.

In the embodiments illustrated in FIG. 2, a computer system 222 includes processor 202 and memory 204. Various common components (e.g., cache memory) are omitted for illustrative simplicity. The computer system 222 is intended to illustrate a hardware device on which the various process and methods described herein can be implemented. The components of computer system 222 and other components of transceiver system 101 can be coupled together via a power and data bus 224 or through some other known or convenient device.

The processor 202 shown in FIG. 2 may be, for example, a conventional microprocessor, microcontroller, a field-programmable gate array (FPGA), and combinations thereof. One of skill in the relevant art will recognize that the terms "processor-readable (storage) medium" or "computer-readable (storage) medium" include any type of device that is accessible by processor 202. Memory 204 is communicatively coupled to processor 202 by, for example, a memory bus 226. In addition to non-transitory media, the memory 204 can include, by way of example but not limitation, random access memory (RAM), such as dynamic RAM (DRAM) and static RAM (SRAM). The memory 204 can be local, remote, or distributed. Non-transitory (e.g., non-volatile) memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory 204 during execution of program instructions by processor 202. The non-volatile memory can be local, remote, or distributed.

Program instructions (e.g., software) are typically stored in non-volatile portions of memory 204 and/or a drive unit (not shown in FIG. 2). Indeed, for large programs, it may not even be possible to store the entire program in the memory 204. Nevertheless, it should be understood that for software to run, if necessary, it is moved to a processor 202-readable location appropriate for processing, and for illustrative purposes, that location is referred herein to as the memory 204. Even when software is moved to the memory 204 for execution, the processor 202 will typically make use of hardware registers to store values associated with the software, and further will cache those values locally to, ideally, speed up execution of program instructions and related operations with respect to memory 204. As used herein, a software program is assumed to be stored at any known or convenient location (from non-volatile storage to hardware registers) when the software program is referred to as "executed by and implemented in a processor 202-readable medium,", and similar terminology. A processor such as processor 202 is considered to be "configured to execute a program" when at least one value associated with the program is stored in a register readable by the processor.

The bus (e.g., data carrying portions of power and data bus 224) also couples the processor 202 and, optionally, the memory 204 to the network interface device 208. The network interface device 208 can include one or more of a modem, a router, and a network interface (e.g., a network interface card (NIC)). It will be appreciated that a modem or network interface can be considered to be part of the computer system 222. The network interface device 208 can include an analog modem, ISDN modem, cable modem, token ring interface, satellite transmission interface (e.g. "direct PC"), or other interfaces for coupling computer system 222 to other computer systems (e.g., remote processor server 206). The network interface device 208 can include one or more input and/or output (I/O) devices. The I/O devices can include, by way of example but not limitation, a keyboard, a mouse or other pointing device, disk drives, printers, a scanner, and other input and/or output devices, including display device 212. The display device 212 can include, by way of example but not limitation, a cathode ray tube (CRT), liquid crystal display (LCD), or some other applicable known or convenient display device.

For simplicity, it is assumed that controllers of any devices not depicted in the example of FIG. 2 reside in the transceiver system 101.

In operation, the computer system 222 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in non-volatile portions of memory 204 and/or drive unit, and causes the processor 202 to execute the various acts required by the operating system to input and output data and to store data in the memory 204, including storing files on the non-volatile memory and/or drive unit.

Figure 3:
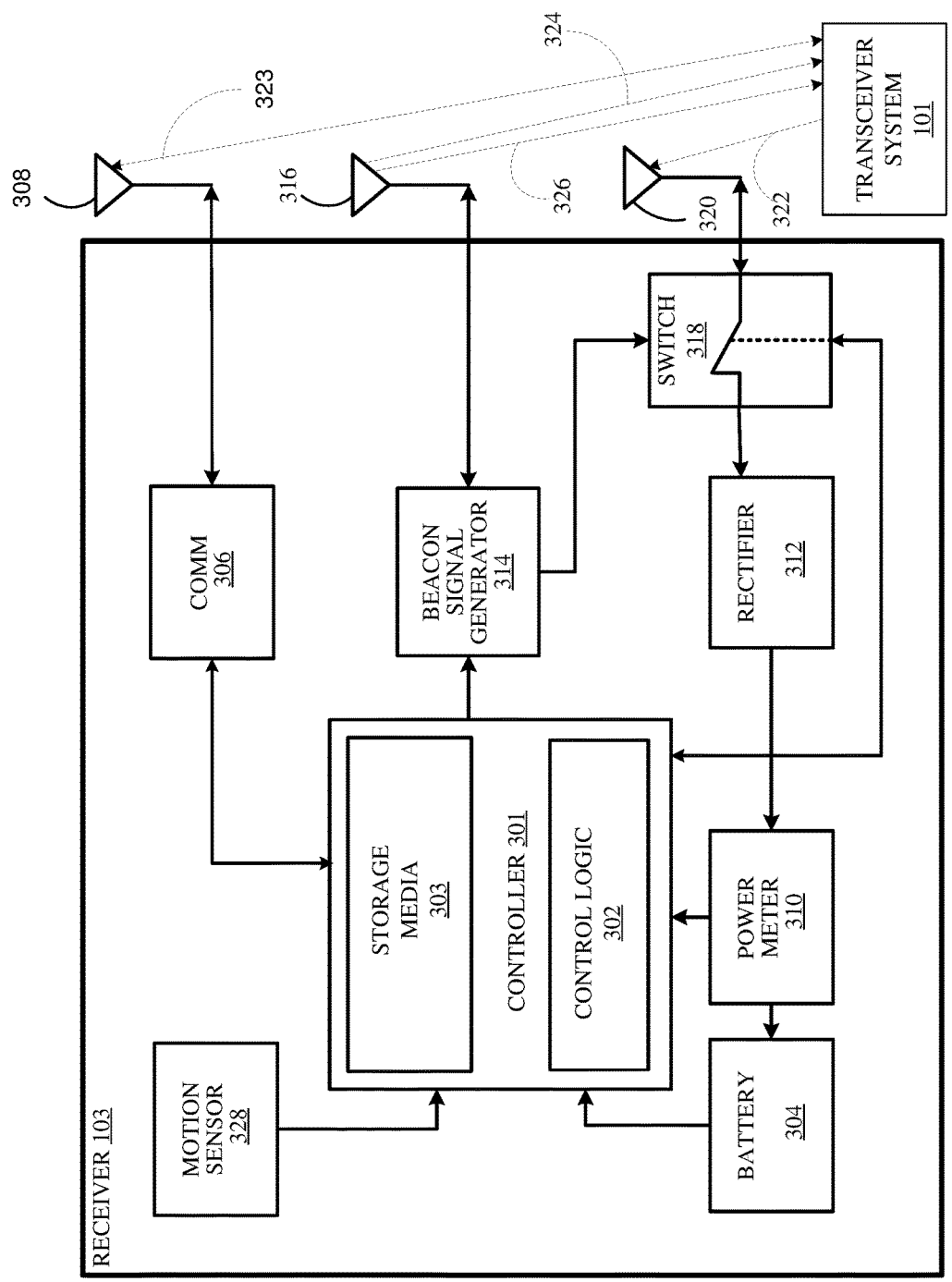
FIG. 3 is a block diagram illustrating an example client receiver in accordance with one or more embodiments of the present technology.

FIG. 3 is a block diagram illustrating an example client power receiver 103 in accordance with one or more embodiments. Client power receiver 103 may include various functional components such as analog and digital electronic devices or modules may be electrically and/or communicatively coupled together. The functional components of client power receiver 103 include a controller 301 having control logic 302 and data storage media 303. Client power receiver 103 also includes a battery 304, a communication block 306 and an associated first antenna 308, a power meter 310, a rectifier 312, a beacon signal generator 314 and an associated second antenna 316, and a switch 318 alternately coupling the rectifier 312 and the beacon signal generator 314 to an associated third antenna 320. Some or all of the above listed components of client power receiver 103 can be omitted in some embodiments. Additional or fewer components are also possible. For example, some embodiments of client devices 102 may also include accelerometers to measure acceleration of the device or a global positioning system that can identify the global positioning coordinates of the receiver and estimate current velocity.

The rectifier 312 receives (e.g., via the third antenna 320) a power transmission signal 322 from the transceiver system 101, which is fed through the power meter 310 to the battery 304 for charging. The power meter 310 measures the total received power signal strength and provides the control logic 302 with this measurement. The control logic 302 can also receive the battery power level from the battery 304 itself or receive battery power level data from, for example, an application programming interface (API) of an operating system running on the client device 102. The control logic 302 can also transmit/receive, via the communication block 306, a data signal on a data carrier frequency, such as the base signal clock for clock synchronization.

Using the second 316 and/or third 320 antennas, the beacon signal generator 314 transmits a beacon signal 324 or a calibration signal 326 to transceiver system 101. Furthermore, in the example embodiment, battery 304, and the first 308, second 316, and third 320 antennas are positioned in the client device 102. In other embodiments, at least one of the battery 304, and the first 308, second 316, and third 320 antennas are positioned in the client device 102. For example, and without limitation, some embodiments of client power receiver 103 can include a dedicated power supply such as a battery cell that may or may not be rechargeable through rectifier 312 and/or a plug-in charger circuit of the client power receiver 103. Thus, in such other embodiments, during such times when client device 102 is powered off, components of the system may remain fully capable of using the second 316 and/or third 320 antennas to transmit beacon signal 324 and/or calibration signal 326, as well as receive power transmission signal 322, for purposes of client device 102 localization and/or wireless power transmission system based battery 304 charging. At least one of the first 308, second 316, and third 320 antennas also enable client device to Tx/Rx a data signal 327 to/from transceiver system 101.

Although the battery 304 shown in FIG. 3 is charged via WPTS through the circuit including rectifier 312, the client power receiver 103 can also receive its supply power directly from the rectifier 312 instead of, or in addition to client power receiver 103 being powered by battery 304. Also, it can be noted that the use of multiple antennas (e.g., antennas 308, 316, and 320) is one example of implementation of client device 102 and as such, the structure can be reduced to one shared antenna, where the client device 102 multiplexes signal reception and transmission.

Client device 102 can also include a motion sensor 328 capable of detecting motion and signaling the control logic 302 of a motion event of client device 102. Client power receiver 103 can also integrate additional motion detection mechanisms such as accelerometers, assisted global positioning system (GPS), or other mechanisms. Once motion sensor 328 determines the motion event, control logic 302 assumes that the motion event equates to the client device 102. Control logic 302 then signals the transceiver system 101 modify the power transmission. In cases where the client power receiver 103 is used in a moving environment like a transceiver system 101-equipped vehicle, power may be transmitted intermittently or at a reduced level until the device is close to losing all available power. Motion sensor 328, as well as the aforementioned additional motion detection mechanisms may be integrated into client device 102.

Figure 4:
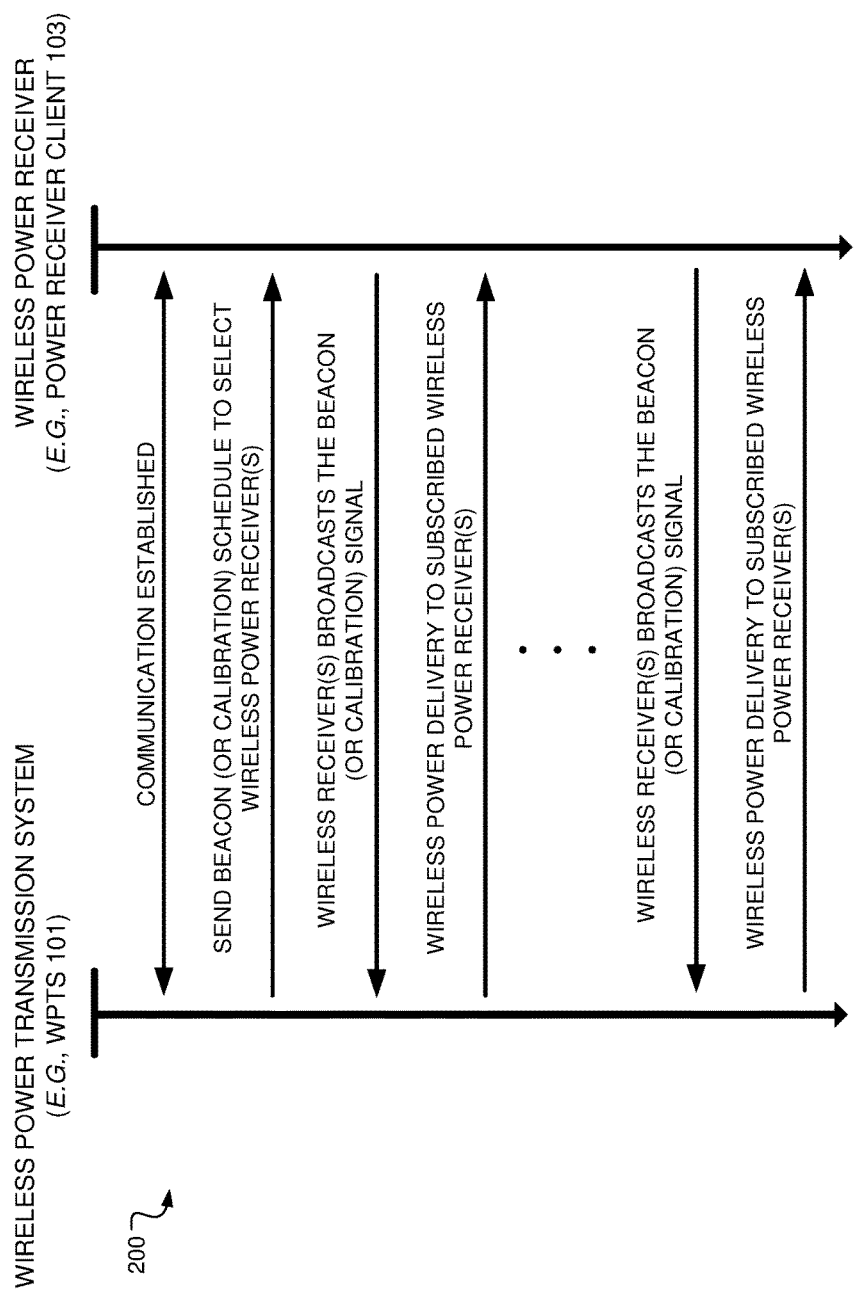
FIG. 4 is a sequence diagram illustrating example operations between a wireless power transmission system and a wireless receiver client for commencing wireless power delivery in accordance with some embodiments.

FIG. 4 depicts a sequence diagram 400 illustrating an example of operations between a wireless power delivery system (e.g., WPTS 101) and a wireless power receiver client (e.g., wireless power receiver client 103) for establishing wireless power delivery in a multipath wireless power delivery, according to various embodiments. Initially, communication is established between the wireless power transmission system 101 and the power receiver client 103. The initial communication can be, for example, a data communication link that is established via one or more antennas 104 of the wireless power transmission system 101. In some embodiments, one or more of the antennas 104a-104n can be data antennas, wireless power transmission antennas, or dual-purpose data/power antennas. Various information can be exchanged between the wireless power transmission system 101 and the wireless power receiver client 103 over this data communication channel. For example, wireless power signaling can be time sliced among various clients in a wireless power delivery environment. In such cases, the wireless power transmission system 101 can send beacon schedule information, e.g., Beacon Beat Schedule (BBS) cycle, power cycle information, etc., so that the wireless power receiver client 103 knows when to transmit (broadcast) its beacon signals and when to listen for power, etc.

Continuing with the example of FIG. 4, the wireless power transmission system 101 selects one or more wireless power receiver clients for receiving power and sends the beacon schedule information to the select wireless power receiver clients 103. The wireless power transmission system 101 can also send power transmission scheduling information so that the wireless power receiver client 103 knows when to expect (e.g., a window of time) wireless power from the wireless power transmission system. The wireless power receiver client 103 then generates a beacon (or calibration) signal and broadcasts the beacon during an assigned beacon transmission window (or time slice) indicated by the beacon schedule information, e.g., Beacon Beat Schedule (BBS) cycle. As discussed herein, the wireless power receiver client 103 includes one or more antennas (or transceivers) which have a radiation and reception pattern in three-dimensional space proximate to the wireless device 102 in which the wireless power receiver client 103 is embedded.

The wireless power transmission system 101 receives the beacon from the power receiver client 103 and detects and/or otherwise measures the phase (or direction) from which the beacon signal is received at multiple antennas. In accordance with some embodiments, wireless power transmission system 101 can record the arrival time diversity (e.g., different phase of arrivals at the same antenna). This information can be used to activate antennas to transmit outgoing signals in a staggered timing to compensate for the propagation delay in the different paths. In some embodiments, the signals may be processed to remove side echoes and the transmission schedule adjusted accordingly.

The wireless power transmission system 101 then delivers wireless power to the power receiver client 103 from the multiple antennas 103 based on the detected or measured phase (or direction) of the received beacon at each of the corresponding antennas by activating the antennas in a reversed (or nearly reversed order). In some embodiments, the wireless power transmission system 101 determines the complex conjugate of the measured phase of the beacon and uses the complex conjugate to determine a transmit phase that configures the antennas for delivering and/or otherwise directing wireless power to the wireless power receiver client 103 via the same path over which the beacon signal was received from the wireless power receiver client 103.

In some embodiments, the wireless power transmission system 101 includes many antennas. One or more of the many antennas may be used to deliver power to the power receiver client 103. The wireless power transmission system 101 can detect and/or otherwise determine or measure phases at which the beacon signals are received at each antenna. The large number of antennas may result in different phases of the beacon signal being received at each antenna of the wireless power transmission system 101.

As discussed above, the wireless power transmission system 101 can determine the complex conjugate of the beacon signals received at each antenna. Using the complex conjugates, one or more antennas may emit a signal that takes into account the effects of the large number of antennas in the wireless power transmission system 101. In other words, the wireless power transmission system 101 can emit a wireless power transmission signal from the one or more antennas in such a way as to create an aggregate signal from the one or more of the antennas that approximately recreates the waveform of the beacon in the opposite direction. Said another way, the wireless power transmission system 101 can deliver wireless RF power to the wireless power receiver clients via the same paths over which the beacon signal is received at the wireless power transmission system 101. These paths can utilize reflective objects 106 within the environment. Additionally, the wireless power transmission signals can be staggered and/or simultaneously transmitted from the wireless power transmission system 101 such that the wireless power transmission signals collectively match the antenna radiation and reception pattern of the client device in a three-dimensional (3D) space proximate to the client device.

As shown, the beacon (or calibration) signals can be periodically transmitted by wireless power receiver clients 103 within the power delivery environment according to, for example, the BBS, so that the wireless power transmission system 101 can maintain knowledge and/or otherwise track the location of the power receiver clients 103 in the wireless power delivery environment. The process of receiving beacon signals from a wireless power receiver client 103 at the wireless power transmission system and, in turn, responding with wireless power directed to that particular wireless power receiver client is referred to herein as retrodirective wireless power delivery.

Figure 5:
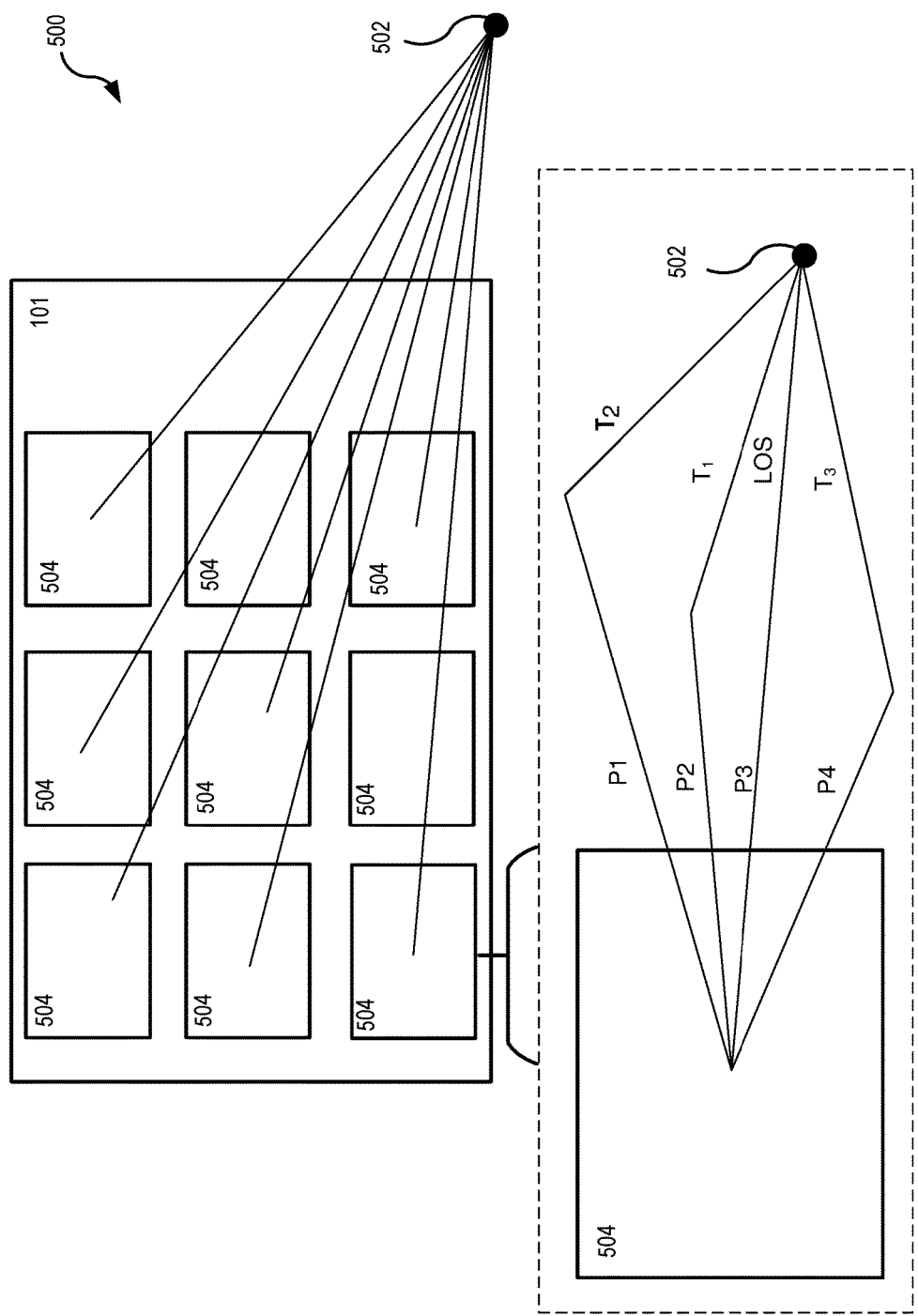
FIG. 5 illustrates an example multipath wireless power delivery environment according to some embodiments of the present technology.

FIG. 5 illustrates an example multipath wireless power delivery environment 500 according to some embodiments. As illustrated in FIG. 5, a wireless device 502 delivering power to WPTS 101 having multiple antennas 504. The multipath wireless power delivery environment 500 can includes reflective objects (not shown) and various absorptive objects, e.g., users, or humans, furniture, etc. As a result, multiple paths P1-P4 may exist between wireless device 502 and antennas 504. The wireless device 502 transmits a beacon (or calibration) signal over multiple paths to the wireless power transmission system 501. The wireless device 502 can transmit a beacon in the direction of a radiation and reception pattern such that the strength of the received beacon signal by the wireless power transmission system, e.g., received signal strength indication (RSSI), depends on the radiation and reception pattern. For example, beacon signals are not transmitted where there are nulls in the radiation and reception pattern and beacon signals are the strongest at the peaks in the radiation and reception pattern, e.g., peak of the primary lobe. As shown in the example of FIG. 5, the wireless device 502 transmits beacon signals over four paths each having different propagation delays compared to the line of sight path.

The wireless power transmission system 501 receives beacon signals of increasing strengths via paths. In some embodiments, the beacon signals are directionally transmitted in this manner, for example, to avoid unnecessary RF energy exposure to the user. A fundamental property of antennas is that the receiving pattern (sensitivity as a function of direction) of an antenna when used for receiving is identical to the far-field radiation pattern of the antenna when used for transmitting. This is a consequence of the reciprocity theorem in electromagnetism.

The wireless power transmission system 101 receives the beacon (or calibration) signal via multiple paths P1-P4 at multiple antennas or transceivers. As shown, path P3 is a direct line of sight path while paths P1, P2, and P4 are non-line of sight paths. Once the beacon (or calibration) signal is received by the wireless power transmission system 501, the power transmission system 501 processes the beacon (or calibration) signal to determine arrival times of the beacon signal at each of the multiple antennas 504 and the phases at which the beacon signal is received at each of the multiple antennas or transceivers. Then, power transmission system 501 can reverse time (e.g., −t), for the transmission signal to generate the power transmission signal. The following is a simplified mathematical signal model for four path propagation channels illustrated in FIG. 4 in which time-reversed. By time reversal, there is a possibility to coherently combine different arrivals of the outgoing signal (time–reversed version of incoming beacon) at some point.

Beaconing $$A(t)=C(t)+C(t-\tau_1)+C(t-\tau_2)+C(t-\tau_3)$$

Power Delivery $$R(t)=T(t)+T(t-\tau_1)+T(t-\tau_2)+T(t-\tau_3)$$

where $$T(t)=A(-t)=C(-t)+C(-t-\tau_1)+C(-t-\tau_2)+C(-t-\tau_3)$$

Power Received $$R(t)=C(-t)+C(-t-\tau_1)+C(-t-\tau_2)+C(-t-\tau_3)+C(-t-\tau_1)+C(-t)+C(-t+\tau_1-\tau_2)+C(-t+\tau_1-\tau_3)+C(-t-\tau_2)+C(-t+\tau_2-\tau_1)+C(-t)+C(-t+\tau_2-\tau_3)+C(-t)+C(-t+\tau_3-\tau_1)+C(-t+\tau_3-\tau_2)+C(-t)$$

In accordance with various embodiments, these time reversal techniques can be augmented to traditional phased-array techniques such as beamforming, retrodirective arrays, and the like. In addition, each antenna effectively acts as multiple virtual antennas (e.g., in the time domain). The spacing may be uniform, patterned, non-uniform, or random. Time reversal techniques (e.g., capturing the incoming RF beacons and amplifying/playing back) is one among possibly other implementations that tries to take opportunistic approach to utilize the delay spread of the channel. It is conjectured, if the charger estimates the full channel response, there are more-matched waveforms with less potentially destructive effects on the side-echoes.

Various measurement results show that for most office buildings, the delay spread is the range of 40 to 70 ns, while larger delay spreads up to 300 ns can be expected in large buildings like shopping centers and factories. The average received multipath power is an exponentially decaying function of the excess delay. Further, the amplitudes of individual multipath components are Rayleigh distributed. Even small rooms (5 m×5 m) can give significant delay spreads around 50 ns when there are metal walls. For frequencies around 2 and 5 GHz, the median delay spread is the 50% value, meaning that 50% of all channels has a delay spread that is lower than the median value.

Measurements done at several frequencies simultaneously show that there is no significant difference in the delay spreads when the frequency changes from 850 MHz to 4 GHz. In some embodiments, at least a portion of the signal (e.g., 40-100 ns) can be recorded to get the idea about the channel response we need 1 ns synchronicity if beacon is short pulse. For wideband pulse (e.g., tone-like), the recording times may be able to be relaxed.

Figure 6:
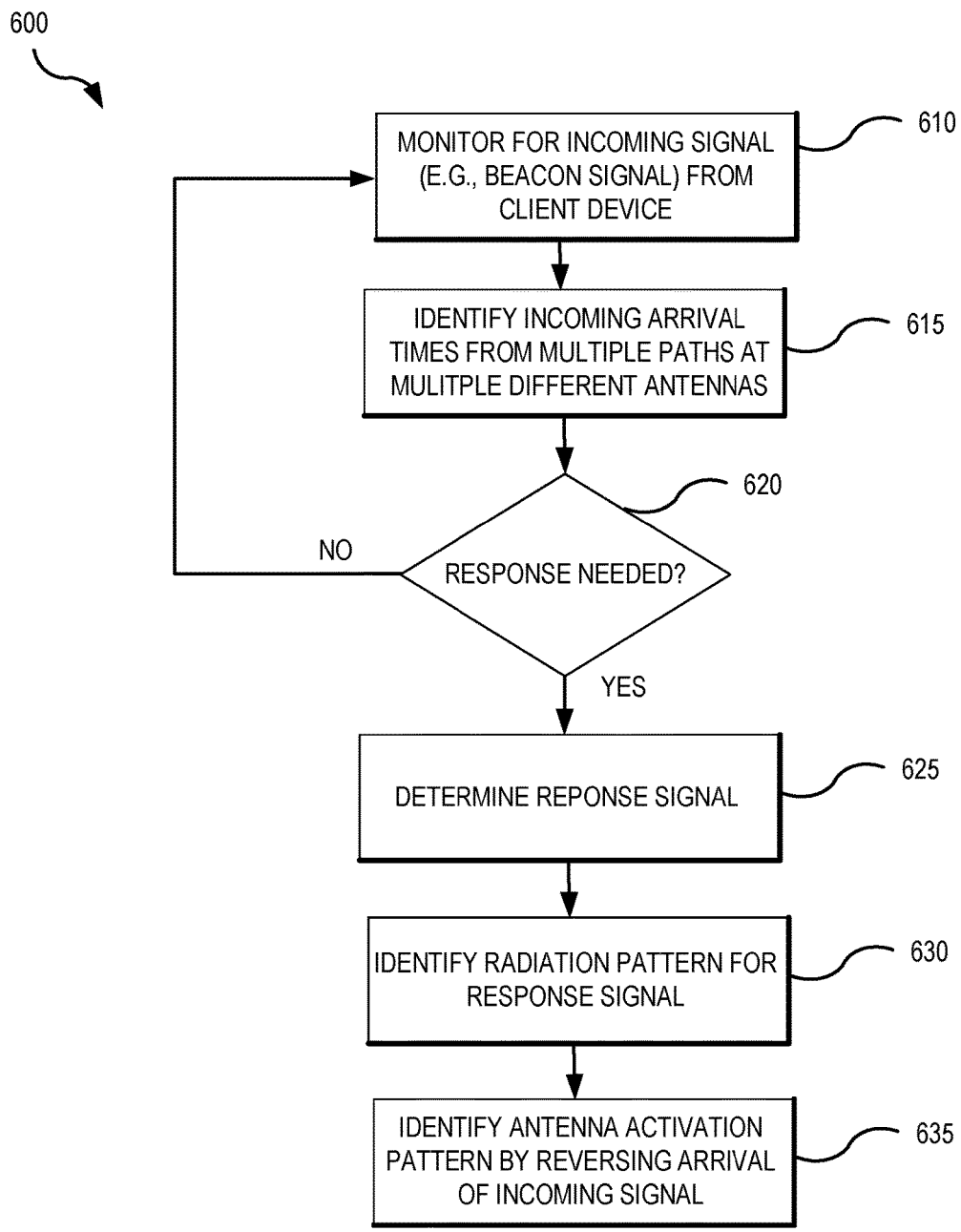
FIG. 6 is a flowchart illustrating a set of operations for operating a wireless communication/power delivery system in accordance with some embodiments of the present technology.

FIG. 6 is a flowchart illustrating a set of operations 600 for operating a wireless communication/power delivery system in accordance with some embodiments of the present technology. As illustrated in FIG. 6, monitoring operation 610 monitors incoming signals from a client device. The signal may be a beaconing signal, a calibration signal or some other type of communications. Identification operation 615 can identify incoming arrival times from multiple paths at one or more different antennas. This can be used to create a response profile for generating a response to the incoming signal. Determination operation 620 determines whether a response is needed. If no response is needed, then determination operation 620 branches to monitoring operation 610 where the system monitors for additional incoming signals. If no response is needed, then determination operation 620 branches to response operation 625 where an appropriate response is created. Timing operation 630 identifies a radiation pattern for the response signal. Then activation operation 635 can set antenna activation based on a reversed timing of the incoming signal.

Figure 7:
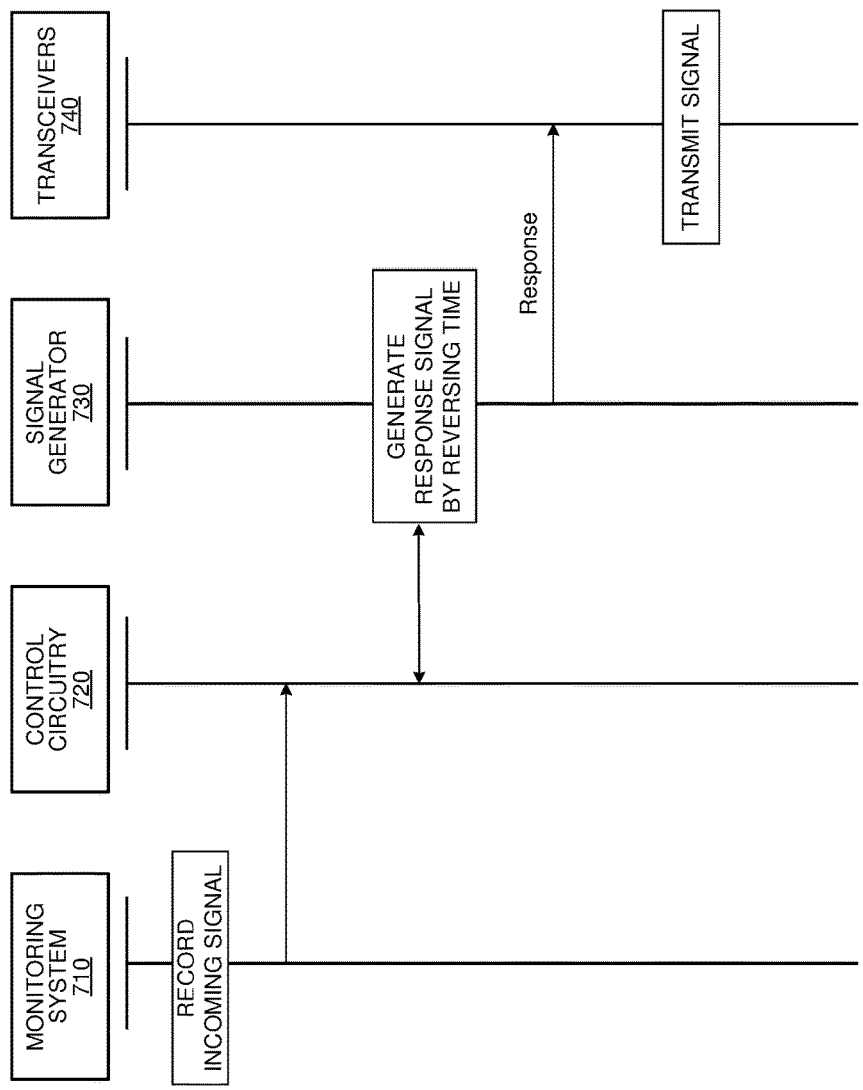
FIG. 7 is a sequence diagram illustrating an example of the data flow between various components of a wireless power transmission system components according to various embodiments of the present technology.

FIG. 7 is a sequence diagram illustrating an example of the data flow between various components of a wireless power transmission system according to various embodiments of the present technology. As illustrated in FIG. 7, monitoring system 710 monitors for a set of incoming signals. Monitoring system 710 can record or store at least a portion of the incoming signal. Control circuitry 720, upon receiving a notification of the recordation, initiate a time reversal processing by signal generator 730. For example, signal generator 730 can use the recorded signal to generate a response signal that effectively reverses the timing of the incoming signal. This response signal can then be transmitted by transceivers 740.

Exemplary Computer System Overview

Figure 8:
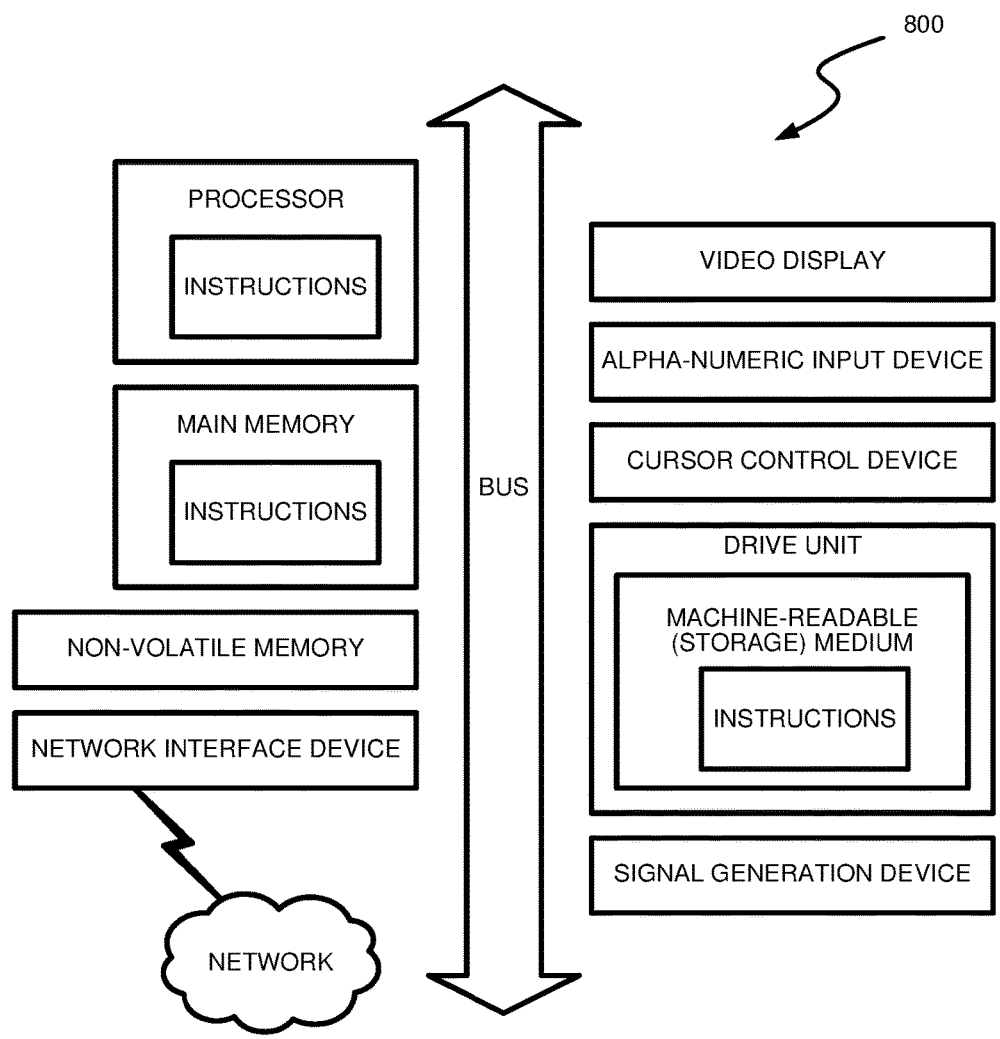
FIG. 8 depicts a diagrammatic representation of a machine, in an example form, of a computer system within which a set of instructions, for causing the machine to perform any one or more of the methodologies discussed herein, may be executed.

FIG. 8 depicts a diagrammatic representation of a machine, in the example form, of a computer system within which a set of instructions, for causing the machine to perform any one or more of the methodologies discussed herein, may be executed.

In the example of FIG. 8, the computer system includes a processor, memory, non-volatile memory, and an interface device. Various common components (e.g., cache memory) are omitted for illustrative simplicity. The computer system 800 is intended to illustrate a hardware device on which any of the components depicted in the example of FIG. 1 (and any other components described in this specification) can be implemented. For example, the computer system can be any radiating object or antenna array system. The computer system can be of any applicable known or convenient type. The components of the computer system can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 800. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this document. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium". A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, ISDN modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 8 reside in the interface.

In operation, the computer system 800 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally conceived to be a self-consistent sequence of operations leading to a desired result. These operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method comprising:
    receiving, at an array of antennas, a wireless signal from a client device;
    recording the wireless signal received at each antenna in the array of antennas; and
    generating a coherent transmission signal to be sent to the client device from the array of antennas, wherein the coherent transmission signal is created by transmitting the coherent transmission signal at each antenna in a reverse order of the wireless signal received at each of the array of antennas.

2. The method of claim 1, further comprising recording a magnitude of the wireless signal received at each antenna in the array of antennas, and wherein generating the coherent transmission signal includes adjusting corresponding magnitudes of the coherent transmission signal in the array of antennas.

3. The method of claim 1, wherein the array of antennas is an adaptively-phase antenna array and the method further comprises identifying side echoes and estimating a full channel response by removing any identified side echoes.

4. The method of claim 1, wherein the wireless signal is a beacon signal and the coherent transmission signal is a response to the beacon signal.

5. The method of claim 1, further comprising:
    recording at least a portion of the wireless signal from the client device at each antenna; and
    creating an arrival sequence based on the wireless signal recorded at each antenna that is reversed to generate the coherent transmission signal.

6. The method of claim 1, further comprising creating a propagation channel profile based on the wireless signal recorded at each antenna in the array of antennas by identifying one or more phases of the wireless signal at each antenna.

7. The method of claim 6, wherein the wireless signal transmitted from the client device takes multiple paths that arrive at the array of antennas at different times.

8. A wireless power transmission system comprising:
an antenna array having multiple radio frequency (RF) antennas; and
control circuitry operatively coupled to the multiple RF antennas, the control circuitry configured to:
record arrival of a wireless signal from a client device at each of the RF antennas in the antenna array;
generate an arrival profile based, at least in part, on the arrival of the wireless signal at each RF antenna in the antenna array; and
send, from the antenna array, a transmission signal to the client device by reversing the wireless signal.

9. The wireless power transmission system of claim 8, further comprising a memory, and wherein the control circuitry is further configured to record, in the memory, at least a portion of the wireless signal in a time domain and identifies an arrival sequence.

10. The wireless power transmission system of claim 8, wherein the wireless signal is in a multipath environment and the control circuitry is further configured to identify a timing offset for each RF antenna.

11. The wireless power transmission system of claim 8, further comprising a signal generator to process the wireless signal and generate the transmission signal.

12. The wireless power transmission system of claim 8, wherein the arrival profile also includes a magnitude and phase of the wireless signal received at each RF antenna in the antenna array, and wherein to send the transmission signal the control circuitry adjusts, based on the arrival profile, the magnitude and phase of each transmission from the multiple RF antennas.

13. The wireless power transmission system of claim 8, wherein the control circuitry is further configured to identify side echoes and estimate a full channel response by removing any identified side echoes.

14. The wireless power transmission system of claim 8, wherein the transmission signal is a time reversed version of the wireless signal.

15. A computer-readable storage medium containing a set of instructions that when executed by one or more processors cause a machine to:
monitor multiple antennas of a wireless power transmission system within a multipath environment;
determine, upon receiving a wireless signal, an arrival profile of the wireless signal received via the multiple antennas of the wireless power transmission system;
calibrating the multiple antennas by setting a timing offset of each antenna of the multiple antennas;
generate a transmission profile based at least in part on a time reversal of the arrival profile and timing offset of each antenna; and
sending a transmission signal using the transmission profile such that the transmission signal is emitted from the multiple antennas of the wireless power transmission system based on the transmission profile.

16. The computer-readable storage medium of claim 15, wherein the set of instructions further cause the machine to determine a phase and magnitude of the wireless signal at each of the multiple antennas.

17. The computer-readable storage medium of claim 16, wherein the phase and magnitude of the wireless signal are stored as part of the arrival profile.

18. The computer-readable storage medium of claim 17, wherein the set of instructions further cause the one or more processors to store at least a portion of the wireless signal.

19. The computer-readable storage medium of claim 17, wherein the set of instructions further cause the machine to identify side echoes and estimate a full channel response by removing any identified side echoes.

20. The computer-readable storage medium of claim 15, wherein the set of instructions further cause the machine to identify the wireless signal by using a pattern matching analysis.

* * * * *